Patented June 4, 1935

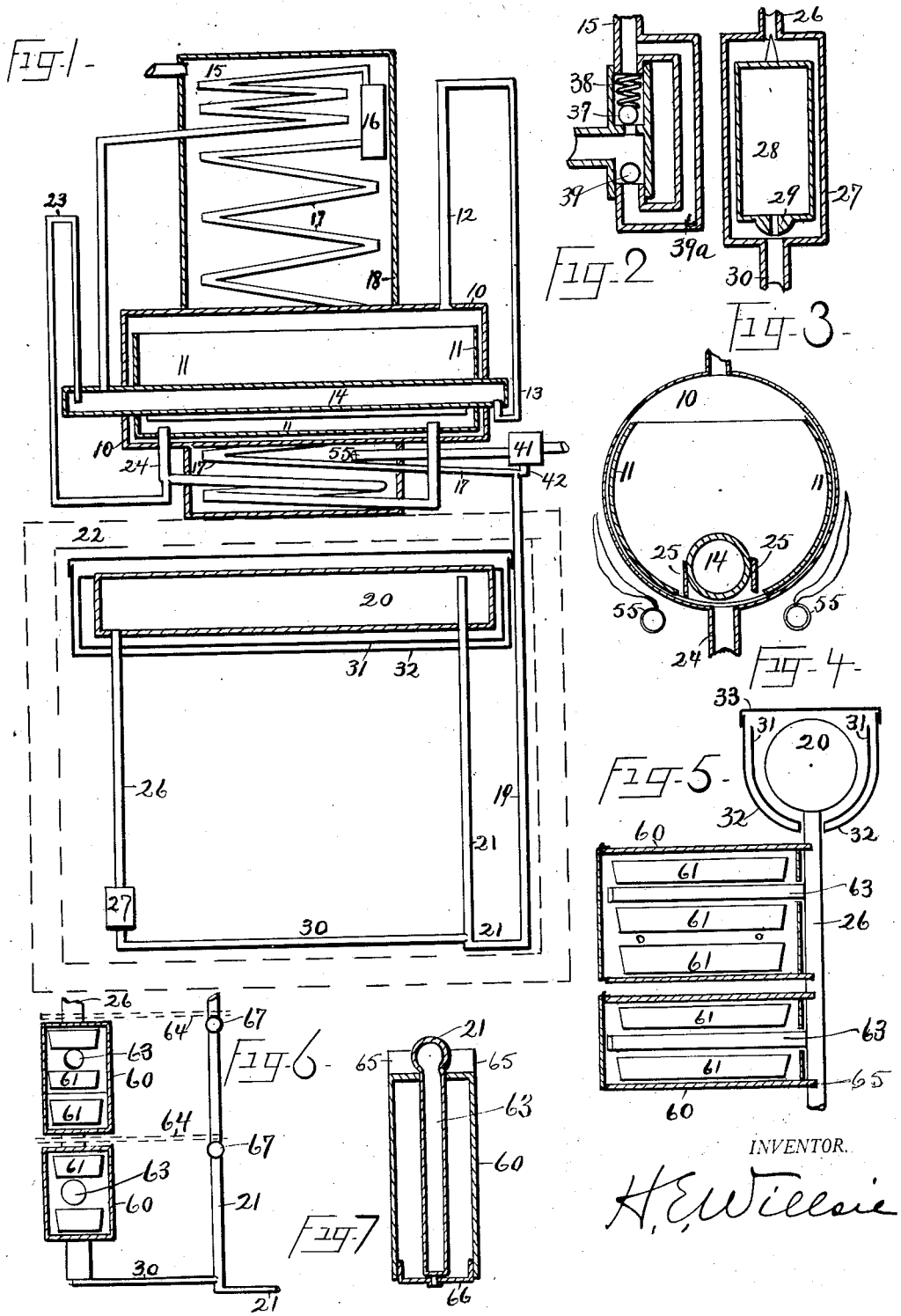

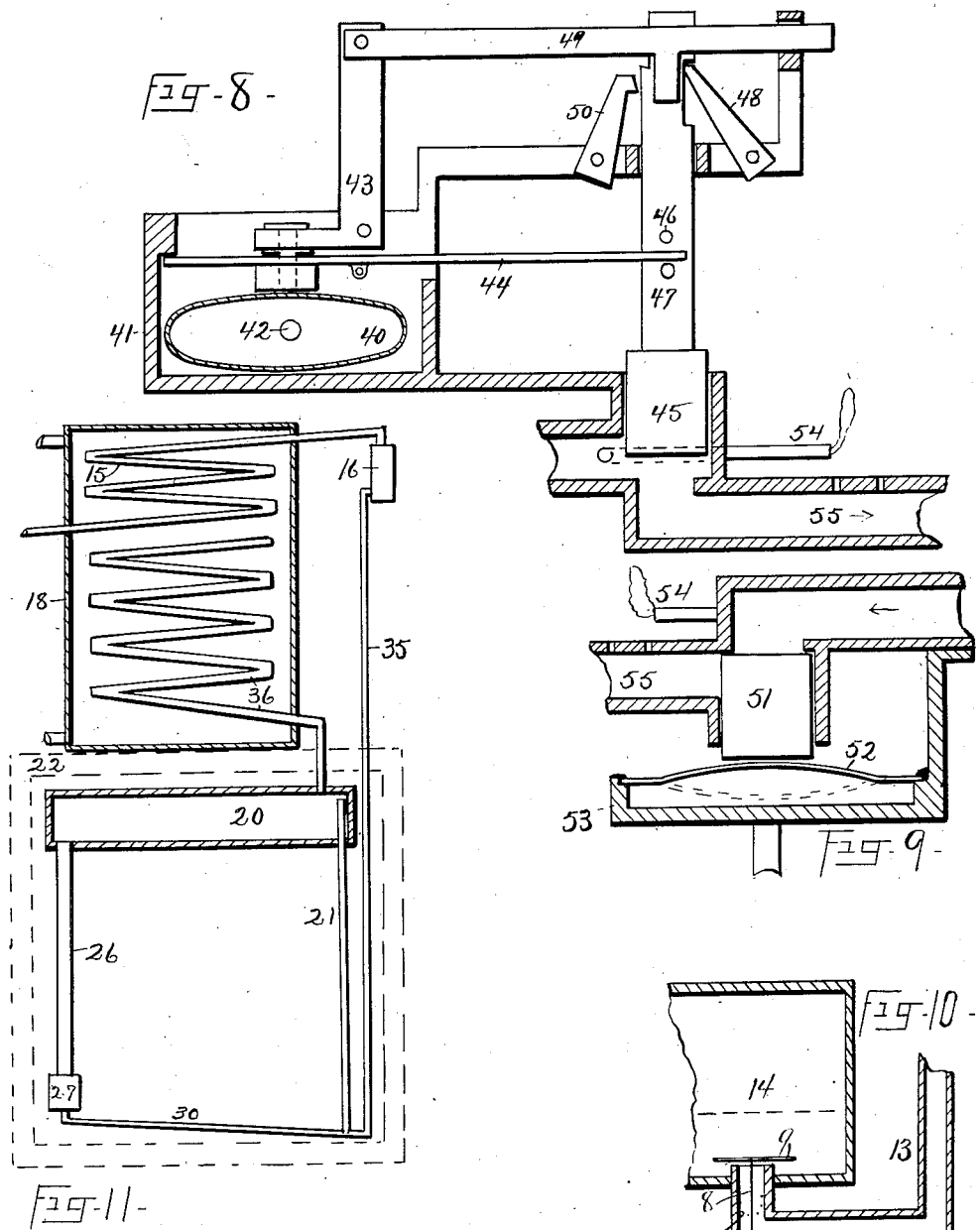

2,003,411

UNITED STATES PATENT OFFICE 2,003,411

REFRIGERATION APPARATUS AND METHOD

Henry Elmer Willsie, New York, N. Y.

Application September 28, 1927, Serial No. 222,515

30 Claims. (Cl. 62—120.5)

My invention relates to improvements in refrigeration apparatus of the intermittent absorption type, such as have in general been described in Patents #1,196,463; 1,364,339; 1,455,823; and Reissues #14,884 and 14,885 issued to me.

The objects of this invention are to provide automatic devices enabling such an absorption apparatus to repeat its operating cycles; and, more particularly, to provide an automatic valve of the hydrometer type arranged to return liquor from the evaporator to the still-absorber; to provide a control trap attached to and heated by the still; to provide a pressure regulator adapted to maintain a higher pressure in the evaporator than in the still-absorber during the absorbing period; to provide an automatic control adapted to turn on and off the heat by the varying pressures in the evaporator; to provide a water or ice shield about the evaporator; to provide a float adapted to the pressures of an absorption apparatus; to provide separated compartments for freezing ice; to provide a control trap arranged to conserve heat; and to provide an arrangement of the apparatus adapting it to the cooling of a household refrigerating box.

Other objects appear in the description.

I attain these objects by the means shown in the accompanying drawings, in which, Fig. 1 is a vertical diagrammatic view of the apparatus; Fig. 2, a vertical section through the pressure regulator; Fig. 3, a vertical section through the hydrometer float in its chamber; Fig. 4, a vertical cross section through the still; Fig. 5, a vertical section through the water shield and freezing compartments; Fig. 6, a vertical sectional front view of the ice freezing compartments; Fig. 7, a horizontal section of the same; Fig. 8, a vertical sectional view of the fuel control; Fig. 9, a vertical view of a fuel control using a snap diaphragm; Fig. 10, a vertical section through an end of the control trap showing a wafer valve; and Fig. 11, a vertical diagrammatic view showing pipe connection when the evaporator is between the still and condenser.

Similar characters refer to similar parts and parallel lines are used to indicate pipes.

The apparatus is constructed of iron or steel except where otherwise indicated.

The operation is as follows: The still 10, having been partly filled with aqua ammonia, called liquor, is heated by flames from the gas burners 55. Ammonia gas, and some steam, is thus driven from the liquor through the pipes 12 and 13 into the control trap 14; thence through the rectifier 15, and the pressure regulator 16, into the condenser 17 where the gas is liquefied by giving up its heat under pressure to the water in the tank 18. The liquefied ammonia drains to the evaporator 20 through the pipes 19, 21. The rectifier 15 drains into the control trap 14, nearly filling it with liquor. The still 10 contains a circulator 11 arranged so that there is a small space between its outer surface and the inner surfaces of the still. During the heating of the outer walls of the still by the flames shown in Fig. 4, there is an upward flow of liquor between the still and the circulator. The circulator is open at the top and at the bottom, and may be of insulating material. Strips 25 are secured to the trap 14 to form an inverted pan to catch and hold returning gas bubbles until absorbed. During the first part of the heating period heat from the trap passes to the liquor in the still. During the last part of the heating period heat from the still distills ammonia gas from this liquor making it less volatile for a seal. As shown in Fig. 10, the end of pipe 13 is provided with a wafer valve 9 held loosely in place by the wire 8, which may slide within a spider 7. This wafer valve prevents surging of the liquid seal in pipe 13.

When the heating of the still is stopped, the liquid ammonia in the evaporator vaporizes taking heat from the refrigerating box 22, indicated by dotted lines. The gas returning to the still absorber 10 drives any liquid left in the small pipes 21, 19, 17 back to the trap 14. Excess liquid in this trap is forced through pipe 23 into the cooling loop 24 and to the still absorber. The returning gas also sets up a circulation of liquor in the cooling loop 24.

Within the float chamber 27, which is connected by the pipe 26 to the bottom of the evaporator 20, is a float 28 so weighted as to act as a hydrometer. Liquor collecting in the float chamber of a specific gravity so heavy that it is desired to drain it to the still absorber lifts the float, opening the valve 29, allowing the liquor to drain into pipe 30 and pipe 21, whence the returning gas forces it toward the still absorber. When the heavy liquor has drained allowing anhydrous ammonia to fill the float chamber the float sinks closing the valve 29. The float chamber 27 and the pipe 26 are in effect part of the evaporator. As shown in Fig. 3, the valve seat 29 is provided with a small hole opening into the interior of the float 28 for the purpose of equalizing the gas pressures within and without the float and for draining the float of liquid.

The evaporator 20 is nearly surrounded by an ice or water shield to give more uniform temperatures in the refrigerating box. This shield is a water container made with an inner wall 31 and an outer wall 32 soldered together at the ends and filled with water. It has a cover 33. There is an air insulation space between the evaporator and the shield.

During the absorbing period the water is partly frozen and the box is protected from too low a temperature. During the heating period, when the evaporator warms, the ice in the shield melts protecting the box from the heat of the evaporator. As the cooling period is considerably longer than the heating period there is usually an accumulation of ice in the shield. There is a make up of water in the shield from frost.

In Fig. 11 is shown an adaptation of the drain and pressure regulator to the gas circuit described in Patents #1,364,339 and Reissue #14,885 issued to me in which the evaporator is situated between the still and the condenser. Gas from the still passes through rectifier 15, the pressure regulator 16, the pipes 35, 21, the evaporator 20 into the dead end condenser 36 where the ammonia is liquefied. This liquid ammonia drains into the evaporator.

The pressure regulator, shown in Fig. 2, has the check ball 37 held to its seat by the spring 38, and has the by-pass pipe 39a closed in one direction by the check ball 39. The tension in the spring is such as to make up the difference in pressure between that in the still absorber and the pressure desired in the evaporator. The higher the pressure in the evaporator the more efficient the apparatus. Gas from the rectifier 15 goes through the by-pass pipe 39a, past the check ball 39, into the condenser, during the heating period. At the beginning of the absorbing period the high pressure in the evaporator raises the check ball 37 against the spring to pass to the still absorber. But the drop in pressure in the evaporator is checked by the ball 37 and the spring 38 at, say, 47 pounds, giving an evaporator temperature of about 20° F. Continued absorption and evaporation will again release gas from the evaporator. Near the end of the absorbing period vaporization is slow and as there is always a slight leak past the check balls the evaporator pressure drops to that of the still. Upon this maintained evaporator pressure until its final drop depends the operation of the control for turning on and off the heat.

In the control shown in Fig. 8, a flattened expansible tube 40, held in a housing 41, is connected by the pipe 42 to the apparatus on the evaporator side of the pressure regulator 16. At the end of the heating period the increasing pressure expands the tube 40 against one end of the pivoted lever 43, energizing the flat spring 44 to close the gas valve 45. The spring is secured to the lever 43 and works loosely at one end between the pins 46, 47 on the stem of the gas valve. The valve is held from closing by latch 48 until it is released by continued movement of the arm 49 pivoted to the lever 43. The valve is held from opening by the trigger 50 until released by the opposite movement of the arm 49. The parts of the control are held in place in relation to each other by the pivots and guides shown.

In the fuel control shown in Fig. 9, the gas valve 51 rests upon a snap diaphragm 52 welded to the case 53. When the pressure increases beyond the critical tension of the diaphragm it snaps up closing the gas valve. When the pressure drops low enough the diaphragm snaps down allowing the valve to open. A pilot light 54 ignites gas from the burner 55.

In Fig. 5 is shown compartments 60 for freezing ice in aluminum trays which rest upon the dead end pipes 63, which project from and communicate with the pipe 26. These pipes 63 contain anhydrous ammonia. The pipes 63 are enclosed by and support the compartments 60, in the manner shown. The compartments are preferably made of fibre coated with paint. The compartments have projections 65 at the back to center upon pipe 26, and a cross brace 66 at the front to be fastened to pipe 63 by a screw.

Food shelves 64 used in the box rest at one end upon the compartments 60 and upon solid forward extending rods 67 welded to the pipe 21.

The devices herein shown may be used in combination with other devices and arrangements shown in the mentioned patents; as a temperature fuel control instead of a pressure fuel control. Or the control trap may be above the still with pipe 14 functioning only as a heat conserver. The still may be ribbed or finned. Locating the still on top of the refrigerating box has the advantage of keeping heat above the box.

What I claim is:

1. The combination in a refrigeration apparatus of a still absorber, condenser and evaporator connected in an operative cycle, means for alternately heating and cooling the still-absorber, a pipe connected at one end to the evaporator and connected at the other end toward the still-absorber, and a hydrometer float valve controlling the flow of liquid from the evaporator through the pipe according to the specific gravity of such liquid.

2. The combination in a refrigeration apparatus of a still absorber, condenser and evaporator connected in an operative cycle, means for alternately heating and cooling the still-absorber, a pipe connected at one end to the bottom of the evaporator and connected at the other end toward the still-absorber, and a hydrometer float valve controlling the flow of liquid from the evaporator through the pipe according to the specific gravity of such liquid.

3. The combination in a refrigeration apparatus of a still absorber, condenser and evaporator connected in an operative cycle, means for alternately heating and cooling the still-absorber, a pipe connected at one end to the bottom of the evaporator and connected at the other end toward the still-absorber, and a hydrometer float valve controlling the flow of liquid from the evaporator through the pipe according to the specific gravity of such liquid, the pipe being arranged so that gas flowing from the evaporator will carry drained liquor to the still-absorber during the absorbing period.

4. The combination in a refrigeration apparatus of a still absorber, condenser and evaporator connected in an operative cycle, means for alternately heating and cooling the still-absorber, a water holding reservoir surrounding a substantial part of the evaporator and an air space between the evaporator and the reservoir.

5. The combination in a refrigeration apparatus of a still absorber, condenser and evaporator connected in an operative cycle, means for alternately heating and cooling the still-absorber, a control trap within and near the bottom of the still-absorber, a pipe connecting the bottom of the trap to the top of the still-absorber and a pipe connecting the top of the trap toward the condenser, and a pipe bent in an upward loop connecting the central part of the trap towards the bottom of the still-absorber.

6. The combination in a refrigeration apparatus of a still absorber, condenser and evaporator connected in an operative cycle, means for alternately heating and cooling the still-absorber, a pipe within and near the bottom of the still-absorber communicating at one end with the top of the still-absorber and connected at the other end towards the condenser.

7. The combination in a refrigeration apparatus of a still absorber, condenser and evaporator connected in an operative cycle, means for alternately heating and cooling the still-absorber, a circulator comprising plates adjacent to the inside walls of the still-absorber with openings at the top and bottom between the plates and a pipe within and near the bottom of the still-absorber communicating at one end with the top of the still-absorber and connected at the other end toward the condenser.

8. The combination in a refrigeration apparatus of a still absorber, condenser and evaporator connected in an operative cycle, means for alternately heating and cooling the still-absorber, a circulator comprising plates adjacent to the inside walls of the still-absorber with openings at the top and bottom between the plates, a control trap within and near the bottom of the still-absorber and near the bottom opening between the plates.

9. The combination in a refrigeration apparatus of a still absorber, condenser and evaporator connected in an operative cycle, means for alternately heating and cooling the still-absorber, a check valve in the pipe connecting the evaporator toward the still-absorber, a spring arranged to yield at a desired evaporating pressure holding the check valve against gas pressure, a by-pass pipe around the spring-held check valve and a check valve in the by-pass pipe.

10. The combination in a refrigeration apparatus of a still absorber, condenser and evaporator connected in an operative cycle, means for alternately heating and cooling the still-absorber, a chamber connected between the evaporator and the still-absorber, a float within the chamber, a valve seat on the bottom of the float and a small opening within the valve seat to the interior of the float.

11. The combination in a refrigeration apparatus of a still absorber, condenser and evaporator connected in an operative cycle, means for alternately heating and cooling the still-absorber, a control trap forming part of the connections between the still-absorber and the condenser, a pipe connecting the top of the still-absorber to the bottom of the trap, and a wafer valve arranged to retard a flow of fluid from the trap toward the still-absorber.

12. The combination in a refrigeration apparatus of a still absorber, condenser and evaporator connected in an operative cycle, means for alternately heating and cooling the still-absorber, a fuel valve, an expansible tube communicating with the evaporator, a housing therefor, a spring pivoted to the housing energized by the expansion of the tube and arranged to operate the fuel valve, a lever pivoted to the housing and actuated by the spring, a trigger and a latch arranged to alternately engage the fuel valve and to be alternately released from the fuel valve by the lever.

13. A refrigerating apparatus of the type that includes a still-absorber comprising a conduit leading to said still-absorber and means for controlling the flow of liquid through said conduit toward said still-absorber, said means being arranged to automatically operate to shut off the flow of liquor through said conduit when the specific gravity of the liquid in said conduit reaches a predetermined value.

14. The combination defined in claim 13 in which said means consists of a float carrying a valve, said float being designed to seat said valve and close said conduit when the specific gravity of said liquid reaches a predetermined value.

15. A refrigeration apparatus including a still-absorber, separate heating means for the sides of said still-absorber and means within said still absorber opposite said heating means to cause the liquor to circulate in separated relatively thin streams between said means and the walls of said still-absorber opposite said heating means.

16. The combination defined in claim 15 in which said means comprises a pair of plates each of which is arranged in spaced parallelism with a substantial portion of a wall of said still-absorber and terminates short of the lowest point in said still-absorber and short of the highest point thereof.

17. A refrigeration apparatus including a still-absorber, a trap having a substantial portion thereof arranged within said still-absorber so that said portion is surrounded by liquor during the heating period of said still absorber, and a conduit extending from said still-absorber to said trap comprising a vertical leg of substantial length extending from said still-absorber and a return leg connected to the upper portion of said vertical leg and to said trap adjacent the lower portion thereof.

18. The combination defined in claim 17 including means associated with said trap within said still-absorber to catch and hold gas bubbles beneath said trap until absorbed.

19. A refrigerating apparatus comprising a still-absorber, an evaporator, a conduit connecting said still absorber and evaporator, a check-valve permitting the flow of fluid from said still-absorber to said evaporator but preventing fluid flow in an opposite direction, a by-pass putting said still-absorber and evaporator in communication independently of the passage controlled by said valve, a second valve in said by-pass, and means biasing said valve toward its closed position but permitting said valve to automatically open when the pressure in said evaporator reaches a predetermined value.

20. A refrigeration apparatus comprising a still-absorber, condenser and evaporator connected in an operative cycle, burners, means to supply fluid to said burners to heat said still-absorber, means to initiate or discontinue the flow of fluid to said burners, said last named means being responsive to variations in pressures in said evaporator above a predetermined amount.

21. The combination defined in claim 20 in which said last named means comprises a shiftable valve, means to hold said valve in open or closed position, and mechanism to first release either of said holding means and to then actuate said valve.

22. A refrigerating apparatus including a still-absorber, means within said still-absorber to separate a small portion of the liquor from the remainder thereof, said means providing an opening into the still-absorber adjacent the bottom thereof and providing a further opening to discharge the liquor separated by said means to a point in said still-absorber adjacent the top thereof, and heating means positioned with respect to said separating means so as to cause a circulation of liquor from said first named opening to said second named opening whereby small portions of the liquor in the still-absorber may be heated successively.

23. A refrigeration system of the intermittent-absorption type comprising a still-absorber, condenser and evaporator connected in an operative cycle, a heat supply for said still-absorber, means for establishing pressure differential between the evaporator end and the still-absorber end of said apparatus, and means to start and stop said heat supply responsive to variations in pressure in said system above a predetermined amount in the evaporator end of said apparatus.

24. A refrigeration apparatus of the intermittent absorption type comprising a still-absorber, condenser and evaporator connected in an operative cycle, a drain for said evaporator opening toward said still-absorber, a conduit extending from said evaporator to said drain, and compartments associated with said conduit so as to be cooled by the anhydrous refrigerant therein.

25. A refrigeration apparatus of the intermittent absorption type comprising a still-absorber, condenser and evaporator connected in an operative cycle, a drain for said evaporator opening toward said still-absorber, a conduit extending from said evaporator to said drain, and compartments associated with said branch conduits extending from said first named conduit and adapted to support compartments so that the latter may be cooled by the anhydrous refrigerant therein.

26. In an absorption refrigerating apparatus, a device for separating the refrigerant and absorbent comprising a cup and a float actuated valve within the cup.

27. In an absorption refrigerating system, a moisture collecting vessel affixed to the lowest portion of the evaporator system, the vessel providing a seat for a float of such density that it seals the return opening when the refrigerant is in a pure condition, but which floats or rises from its seat when the gravity of the fluid in the vessel has been increased by the addition of absorbent, thereby opening the return line and allowing said absorbent to escape from the evaporator system.

28. A method of refrigerating on the principle of absorption comprising absorbing the refrigerant, heating the absorption agent to drive off the refrigerant, condensing the volatilized liquid, allowing the condensate to fall by gravity to a receiving tank, clearing the receiving tank of any condensed absorbent while preventing the passage of the refrigerant, and evaporating the refrigerant.

29. In an absorption refrigerating apparatus, a device for separating the refrigerant and absorbent comprising a cup and a float actuated vented valve within the cup.

30. In an absorption refrigerating apparatus, a still-absorber, condenser and evaporator connected in operative series, a conduit extending from the evaporator toward the still-absorber, a vented hydrometer float valve controlling the flow of liquid through said conduit, the said vented float valve being subject to the pressure of said evaporator.

HENRY ELMER WILLSIE.